United States Patent [19]

Binder et al.

[11] Patent Number: 5,584,570
[45] Date of Patent: Dec. 17, 1996

[54] SIGNAL LAMP

[75] Inventors: Peter Binder, Sachsenheim; Rolf Feger; Peter Grynaeus, both of Bietigheim-Bissingen; Gunther Holzmacher, Asperg, all of Germany

[73] Assignee: ITT Automotive Europe GmbH, Germany

[21] Appl. No.: 403,810

[22] PCT Filed: Sep. 14, 1993

[86] PCT No.: PCT/EP93/02480

§ 371 Date: Apr. 21, 1995

§ 102(e) Date: Apr. 21, 1995

[87] PCT Pub. No.: WO94/07085

PCT Pub. Date: Mar. 31, 1994

[30] Foreign Application Priority Data

Sep. 16, 1992 [DE] Germany .................... 42 30 963.8

[51] Int. Cl.⁶ ........................................... F21Q 1/00
[52] U.S. Cl. ..................... 362/293; 362/80; 362/331; 362/333
[58] Field of Search .............. 362/80, 293, 328, 362/331, 333, 339

[56] References Cited

U.S. PATENT DOCUMENTS 4,241,388  12/1980  Green ................................. 362/293
4,383,290   5/1983  Binder et al. ....................... 362/293
4,656,567   4/1987  Morris ............................... 362/293

FOREIGN PATENT DOCUMENTS 8533666.1  2/1986  Germany .

OTHER PUBLICATIONS

International Search Report for Application PCT/EP93/02480 filed 14 Sep. 1993.

Primary Examiner—James C. Yeung
Assistant Examiner—Sara Sachie Raab
Attorney, Agent, or Firm—J. Gordon Lewis; Thomas N. Twomey

[57] ABSTRACT

In a signal lamp, in particular, for automotive vehicles, comprising a casing, a light source arranged in the casing, a reflector, a closure plate and an optical plate provided between the light source and the closure plate and comprising convex areas at the side thereof facing the light source and concave areas on the side thereof facing away from the light source between which are provided light-impermeable areas on the surface, a homogeneous light distribution is obtained in that the side of the closure plate facing the light source comprises concave recesses.

9 Claims, 2 Drawing Sheets

SIGNAL LAMP

DESCRIPTION

The present invention is concerned with a signal lamp, in particular, for use with automotive vehicles, comprising a casing, a light source arranged within the casing, a reflector for the parallel orientation of the light from the light source, a closure plate, an optical plate provided between the light source and the closure plate, and at least one colour filter disposed in the path of rays, with the optical plate, on the side thereof facing the light source, being provided with convex areas and, in particular, on the side thereof facing away from the light source with concave areas between which are arranged light-impermeable areas.

A so designed signal lamp is taught by DE 85 33 666 U1 in which the light from the light source is parallelized by the reflector and is directed toward the optical plate. The optical plate, at the same time, is in the form of a colour filter, imparting to the light emitted by the light source the required signal colour. Moreover, light-impermeable areas are provided on the side of the optical plate facing away from the light source, which areas convey to the signal lamp, with the light source turned off, a substantially uniform and attractive outward appearance. The light beams from the light source, through the optical plate, are so directed past the light-impermeable areas that the whole of the light entering the optical plate on the one side thereof exits on the other side thereof, leaving the signal lamp through the closure plate. With the light source turned off, a viewer through the closure plate which, as a rule, is transparent, only perceives the light-impermeable areas which are, for example, of black colour, thereby largely preventing a direct view of the colour filter.

A so designed signal lamp involves the disadvantage that the light distribution on the closure plate is not homogeneous, with light accumulations, such as light spots or light bars and the like, being likely to occur.

It is, therefore, the object of the invention to provide a signal lamp of the afore-mentioned type insuring a more homogeneous light distribution.

This problem, in the practice of the invention, is solved in that the side of the closure plate facing the light source is provided with concave recesses.

The design of the closure plate as suggested by the invention involves the advantage that the focal point is outside the lamp and that the black light-impermeable areas do not become clearly manifest from the optical plate. When viewing the signal lamp of the invention, no discrete black areas behind the closure plate, for example, parallel strips interrupted by the intervals of the coloured optical plate, can be seen any longer. When viewing the signal lamp according to the invention merely a dark face of a substantially homogeneous outward appearance is perceivable behind the closure plate.

In another embodiment the convex and concave areas and recesses are provided in series arrangement in the optical light path, thereby causing the beams passing through the individual convex areas of the optical plate to be optimally guided such that, on the one hand, the light-impermeable areas are not affected by the beam focusing while, on the other hand, the focused beam of light diverges again on the closure plate, thereby obtaining a homogenous light distribution externally of the closure plate.

The focal points of the concave areas and of the concave recesses, preferably, lie within a plane parallel to the parallelized light. The so defined arrangement of the optical system insures a precise ray pattern which can be adapted to any desired ambient conditions, such as an inclined assembly of the signal lamps into an automotive vehicle, by a suitable selection of the lenses, at the same time maintaining a homogeneous distribution of light.

Preferably, the optical plate and the closure plate are arranged in parallel, in particular, at an inclination to the horizontal or the parallelized light, i.e. at an angle other than 90°. In this special form of embodiment the fact can be taken into account that the signal lamp not only can be furnished with a vertically oriented closure plate but also with inclined closure plates, thereby enabling the signal lamp to be optimally adapted to the shape of the body of, for example, an automotive vehicle.

In a preferred form of embodiment in which the optical plate is disposed at an inclination to the parallelized light, the side facing the light source is of a ladder-type design, with the individual steps of the ladder being in orthogonal relationship to the parallelized light and are provided with the convex areas. The convex areas, irrespective of the position of the optical plate, always are in orthogonal orientation with the light so that due to the inclination of the optical plate no undesired deflections of the individual light bundles will occur; the same optical properties as with vertically aligned optical plates are rather obtained. This is especially advantageous in case of extremely inclined surfaces of the car body in which the signal lamp has to be adapted to the geometry of the car body.

Preferably, the concave areas of the optical plate are arranged in the direction of the parallelized light behind the convex areas and the focol points lie in a plane parallel to the parallelized light. This embodiment insures that the pencil of rays passes through the optical plate with no substantial directional changes, irrespective of whether the optical plate is arranged vertically or at an inclination. The light bundles emerging from the optical plate then still have the basic direction and only through the convex or concave area are so deflected as to diverge or converge.

Preferably, the distance of the closure plate from the optical plate is so selected as to cause the whole of the light bundle passing through a convex area of the optical plate to pass through the concave recess of the closure plate provided therebehind. Hence, a concave recess of the closure plate is associated to each convex area of the optical plate so that the whole of the ray pencil can be pointedly deflected in the desired direction, with a divergence of the ray pencil being preferred so that immediately after the diverging ray pencil having left the closure plate the individual light rays are already mixed so that it is already at this stage that the emergent light starts to homogenize.

In another embodiment the distance of the closure plate from the optical plate is so selected that the entire light pencil passing through a concave area of the optical plate converges into a focal point, with the latter lying between the optical plate and the closure plate. This involves the advantage that the light pencil re-diverging behind the focal point enters the closure plate with this divergence where it continues to be diverged through the concave recesses. If the focal point of the light pencil is outside the optical plate and outside the closure plate, the additional advantage is obtained that the light pencil is only irrelevantly affected by irregularities, contaminations, structural defects etc. of the plates and that, in addition, no damage can be done to the plates by light concentrations in the focal point.

Advantageously, the convex and concave areas and recesses, respectively, are designed as lenses, in particular, as cylindrical lenses which involves the advantage that the optical system can be simply computed and easily manufactured, for example, from a die-cast plastic material which is transparent or preferably coloured.

In another embodiment the light-impermeable areas are of a strip-type configuration, extending, with the optical plate inclined, in the direction of inclination. If the plate is vertically inclined they extend in the vertical direction, and if horizontally inclined they extend in the horizontal direction. Due to this arrangement or alignment of the light-impermeable areas and of the black strips, respectively, also the signal lamps can be provided with such strips having heavily inclined or curved optical plates. Vertically inclined lamps are those which relative to the vertical plane are tilted forwardly or rearwardly, whereas horizontally inclined lamps are those whose front edge is shifted to the front or to the rear.

Further advantages, features and details of the invention will become manifest from the following description illustrating and explaining in closer detail two forms of embodiment with reference to the drawing, wherein FIG. 1 shows a vertical section through a signal lamp according to the invention;

Figure 1:
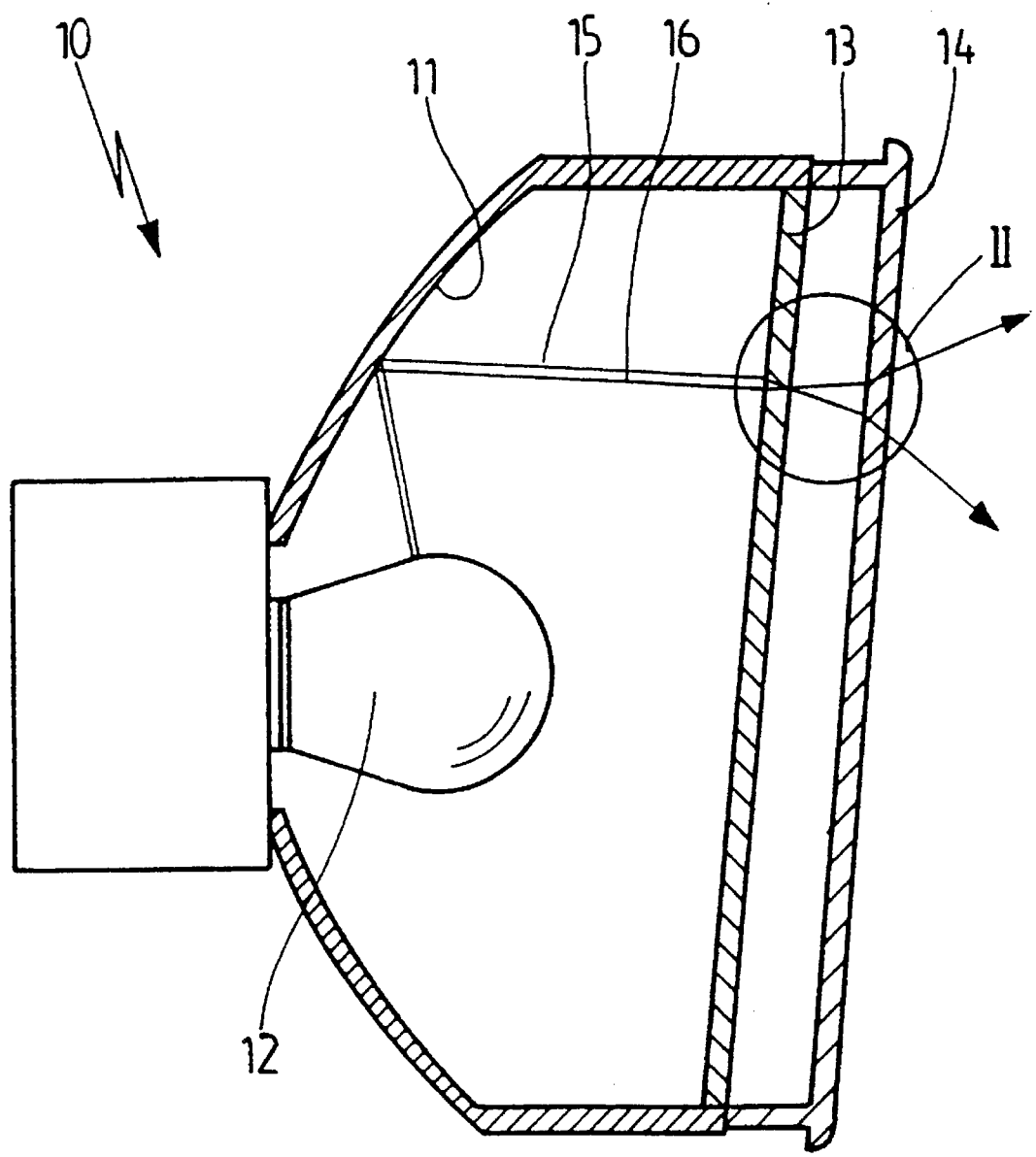

Referring to the drawings, the casing of the signal lamp as shown in FIG. 1 and generally designated by reference numeral 10, on the inner side comprises a reflector 11 orienting, in the parallel direction, the light emerging from a fluorescent lamp serving as a light source 12 and deflecting such light toward an optical plate 13 and a closure plate 14 arranged therebehind. The optical plate 13 and the closure plate 14 extend substantially in parallel with respect to one another and are arranged at a slight inclination vis-à-vis the vertical plane. The optical plate 13 is designed as a colour filter imparting to the light passing therethrough the desired signal colour. The closure plate 14 can consist, for example, of a rosy or transparent material. However, it is also possible for a colour filter to be provided ahead of or behind the optical plate 13. The detailed design of the optical plate 13 and of the closure plate 14 is shown in FIGS. 2 and 3 in which a cut II is shown in detail.

Figure 2:
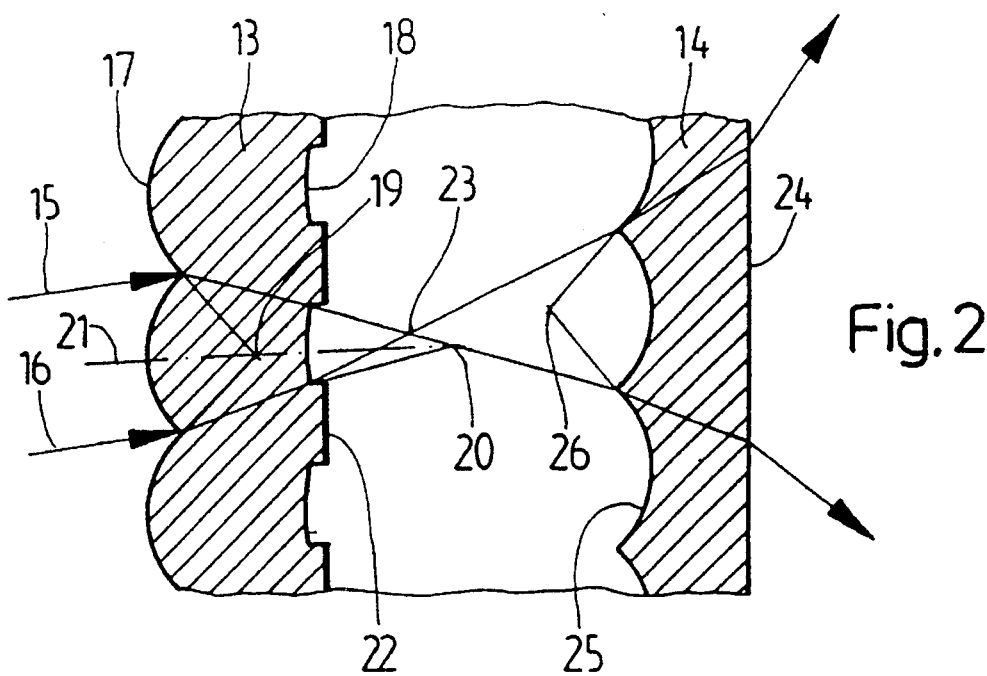
FIG. 2 shows a cut II according to FIG. 1 illustrating a first form of embodiment of the design of the optical plate according to the invention, and of the closure plate.
Figure 3:
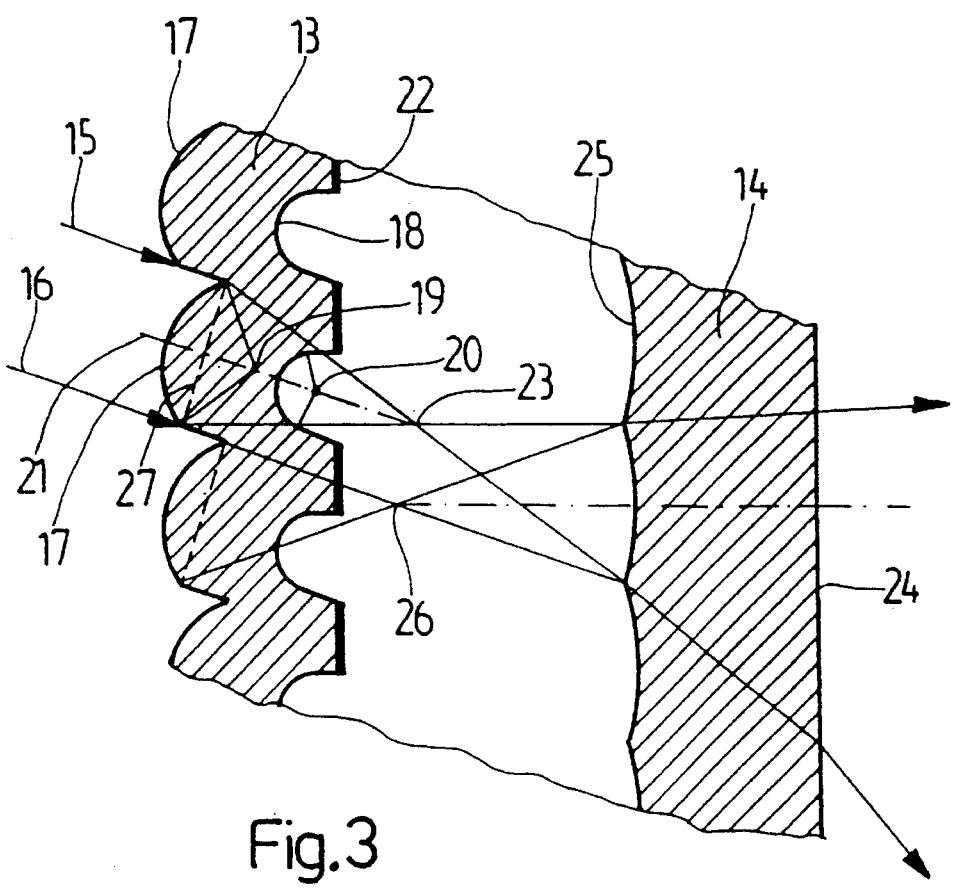
FIG. 3 shows a cut II according to FIG. 1, illustrating another form of embodiment of the optical plate and of the closure plate of the invention, with the direction of inclination being differently selected in this form of embodiment.

In the example of embodiment as shown in FIG. 2, the two plates 13 and 14 are arranged in a manner slightly tilted vis-à-vis the direction of the incident light beams 15 and 16 as already qualitatively shown in FIG. 1. The side of the optical plate 13 facing the light source 12 not shown in FIG. 2 is provided with convex areas 17 while the opposing side has concave areas 18. The areas 17 and 18 are configured as lenses, in particular, as cylindrical lenses the focal points 19 and 20 of which lie along a line 21 orthogonally passing through the optical plate 13. The convex areas 17 gaplessly cover the side of the optical plate 13 facing the light source 12 whereas the concave areas 18 respectively are in spaced relationship with respect to one another. Provided between the individual concave areas 18 are light-impermeable areas 22 which are formed, for example, by a colour coating, a rolled-on foil, an evaporated metal coating or the like. As a rule, the light-impermeable areas 22 are of a strip-type configuration although the invention is not restricted to that design. The convex areas 17 are so designed that the limiting rays 15 and 16 are deflected to such an extent that they impinge between the light-impermeable areas 22 on the concave areas 18, thereby causing the whole of the light striking the side of the optical plate 13 facing the light source 12 to exit from the optical plate 13 on the rear side thereof. Moreover, the curvature of the concave areas 18 is so selected that the light pencil formed by the limiting rays 15 and 16 converges into a point 23 which lies between plates 13 and 14. If the areas 17 and 18 are formed as cylindrical lenses, the points 19, 20 and 23 form lines.

The closure plate 14 has a substantially smooth external surface 24, while the side facing the light source 12 is provided with concave recesses 25. These recesses 25 also are designed as lenses, preferably cylindrical lenses, and have a focal point 26 which lies between the two plates 13 and 14. The concave recess 25 is so arranged on the closure plate 14 and has a size such that the light bundle limited by the rays 15 and 16 and diverging behind point 23 fully impinges on a single concave recess 25 to be deflected thereby. Thanks to the concave configuration of the recess 25, the divergence of the light bundle is further enhanced so that it forms a broad light cone at the exit on the closure plate 14, i.e. at the external surface 24. As such a broad light cone is associated to each of the concave recesses 25 the individual light bundles are thoroughly mixed, thereby achieving a high homogeneity already in the immediate vicinity of the external surface 24 of the closure plate 14. Moreover, thanks to the thorough mixture of the individual light bundles, single defective spots either in the optical plate 13 or in the closure plate 14 imparting to the respective bundle either an irrelevantly different colour or ray direction are overradiated by the adjacent ray bundles so that such defects cannot be perceived by the human eye.

The light entering through the closure plate 14 to the major part thereof impinges on the light-impermeable areas 22 of the optical plate 13. The reflected light is then equally scattered through the concave recesses 25 so that the signal lamp according to the invention with the light source turned off is of a uniform outward appearance. In particular, the light-impermeable areas 22, for example, black strips or the like, do not become so manifest as they do in conventional signal lamps.

In the form of embodiment of a signal lamp according to the invention as shown in FIG. 3, the side of the optical plate 13 facing the light source 12 is of a ladder-type configuration, with each step 27 being provided with a convex area 17. This involves the advantage that the line 21 passing through the two focal points 19 and 20 of the two areas 17 and 18 can have the direction of the rays 15 and 16 so that the whole optical system of the optical plate 13 can be of a simpler configuration as, basically, it is in orthogonal relationship to the ray direction. It is also in this form of embodiment that the closure plate is so arranged that the light bundle limited by the light rays 15 and 16 completely impinges on a concave recess 25 and is further diverged by the latter. The light cone emerging from the external surface 24 of the closure plate 14 in this case is directed irrelevantly downwardly.

Advantageously, the strip-type light-impermeable areas 22 extend in the direction of inclination of the optical plate 13 and of the entire signal lamp, respectively, i.e. in vertically inclined lamps they extend in the vertical direction while in horizontally inclined lamps they extend in the horizontal direction. Thanks to this arrangement the strips can also be attained with heavily inclined or curved lamps. The optical distance of the strips from one another in that case remains substantially equal.

We claim:

1. A signal lamp for automotive vehicles, comprising a casing, a light source provided in the casing for generating light, a reflector for orienting in parallel the light from the light source, a closure plate attached to said casing, an optical plate provided between the light source and the closure plate, wherein said optical plate includes at least one color filter, said color filter including convex areas on a side thereof facing toward the light source and further including concave areas between which are provided light-impermeable areas, wherein the side of the closure plate facing the light source includes concave recesses and, wherein, the distance of the closure plate from the optical plate is selected such that the light passing through the convex area of the optical plate converges into a focal point line between the optical plate and the closure plate.

2. A signal lamp according to claim 1, wherein the convex and concave areas and the recesses are series-arranged in the path of rays of the light.

3. A signal lamp according to claim 1 wherein the focal points of the convex areas and of the concave recesses lie in a plane parallel to the parallelized light.

4. A signal lamp according to claim 1, wherein the optical plate and the closure plate are arranged in parallel.

5. A signal lamp according to claim 1, wherein the optical plate is disposed at an inclination to the parallelized light.

6. A signal lamp according to claim 5, wherein the concave areas lie on a surface of said color filter that faces said closure plate.

7. A signal lamp according to claim 1, wherein the distance of the closure plate from the optical plate is so selected that the light passing through said convex area of the optical plate passes through the concave recess of the closure plate arranged therebehind.

8. A signal lamp according to claim 1, wherein the convex and concave areas and recesses, respectively, are formed as lenses, in particular, as cylindrical lenses.

9. A signal lamp for automotive vehicles, comprising:

a casing;

a light source provided in the casing for generating light;

a reflector for orienting in parallel the light from the light source;

a closure plate attached to the casing; and an optical plate provided between the light source and the closure plate, wherein the optical plate includes at least one color filter, the color filter including convex areas on a side thereof facing toward the light source and further including concave areas between which are provided light-impermeable areas, wherein the side of the closure plate facing the light source includes concave recesses, and wherein the light and permeable areas are of a strip-type configuration.

* * * * *